(12) United States Patent
Grimm et al.

(10) Patent No.: US 11,637,900 B1
(45) Date of Patent: Apr. 25, 2023

(54) METHOD AND SYSTEM FOR FACILITATING USES OF CODES FOR VEHICLE EXPERIENCES

(71) Applicant: GM Global Technology Operations LLC, Detroit, MI (US)

(72) Inventors: Donald K. Grimm, Utica, MI (US);
Richard Gordon, Canton, MI (US);
Wei Tong, Troy, MI (US); Shuqing Zeng, Sterling Heights, MI (US); Shige Wang, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/746,286

(22) Filed: May 17, 2022

(51) Int. Cl.
*G06F 15/16* (2006.01)
*H04L 67/12* (2022.01)

(52) U.S. Cl.
CPC .................... *H04L 67/12* (2013.01)

(58) Field of Classification Search
CPC ........................................................ H04L 67/12
See application file for complete search history.

(56) References Cited

U.S. PATENT DOCUMENTS 10,042,359 B1* 8/2018 Konrardy ................ G06F 30/20
2021/0049901 A1* 2/2021 Young ..................... G08G 1/0969

* cited by examiner

*Primary Examiner* — Normin Abedin
(74) *Attorney, Agent, or Firm* — Vivacqua Crane PLLC (57) ABSTRACT

A method for facilitating uses of a code for vehicle experiences includes receiving code data from the code in a sign. The sign is disposed outside a host vehicle. The method further includes establishing a connection with a service using the code data obtained from the code and in response to establishing the connection with the service, receiving service data. The service data includes information about the service. The method further includes, in response to receiving the service data, controlling the host vehicle according to the service data received after establishing the connection with the service.

17 Claims, 3 Drawing Sheets

METHOD AND SYSTEM FOR FACILITATING USES OF CODES FOR VEHICLE EXPERIENCES

The present disclosure relates to a system and method for facilitating uses of codes for vehicle experiences.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Sometimes, it is useful to acquire information while the vehicle is in motion. For example, it is desirable to obtain information about road conditions while the vehicle is in motion. For this reason, there is a need to develop methods and systems that allow the vehicle operator to obtain information while the vehicle is moving.

SUMMARY

The present disclosure describes a method and system for obtaining information while the vehicle is in motion. Specifically, the presently disclosed method and system may be used to manage Uniform Resource Locator (URL) exchanges, thereby providing information, content, and relevant vehicle transactions to enhance the vehicle experience. The presently disclosed system and method allows access to real-time metrics about the vehicle that may be used to improve awareness for vehicle operators, management entities, and institutional support. The system enables URL exchanges offerings that can improve route selection, trip planning, and in-vehicle experiences through third-party content.

The present disclosure describes a method for facilitating uses of a code for vehicle experiences. In an aspect of the present disclosure, the method includes receiving code data from the code in a sign. The sign is disposed outside a host vehicle. The method further includes establishing a connection with a service using the code data obtained from the code and, in response to establishing the connection with the service, receiving service data. The service data includes information about the service. The method further includes, in response to receiving the service data, controlling the host vehicle according to the service data received after establishing the connection with the service. The method described in this paragraph improves vehicle technology by allowing the vehicle to obtain information related to a particular geographic area and controlling the vehicle using this data.

In an aspect of the present disclosure, the connection with the service is established via a Uniform Resource Locator (URL). The code data includes the URL. The code is a quick response (QR) or similar code.

In an aspect of the present disclosure, controlling the host vehicle according to the service data includes sending vehicle data of the host vehicle to a remote server in real time, and the vehicle data includes a speed of the host vehicle.

In an aspect of the present disclosure, the service data is an alert. The alert is indicative that a person is missing. The alert includes relevant-vehicle data. The relevant-vehicle data includes information about a relevant vehicle that transports the person that is missing. Controlling the host vehicle includes scanning a plurality of remote vehicles within a predetermined distance from the host vehicle to identify the relevant vehicle.

In an aspect of the present disclosure, the service data includes real-time data about a commercial establishment. The real-time data about the commercial establishment indicates whether the commercial establishment is open. The real-time data about the commercial establishment includes a location of the commercial establishment.

In an aspect of the present disclosure, the method further includes determining that the commercial establishment is open based the service data and, in response to determining that the commercial establishment is open, providing navigational instructions to a vehicle operator to reach the location of the commercial establishment.

In an aspect of the present disclosure, the service data includes real-time data about road conditions along a route of the host vehicle. The road conditions include a triggering event. The triggering event includes at least one chosen from a road closure, a lane closure, a speed reduction, workers present on the roadway, a traffic congestion, a road construction, and a vehicular accident.

In an aspect of the present disclosure, the method includes determining that the triggering event has occurred along the route of the host vehicle and, in response to determining that the triggering event has occurred along the route of the host vehicle, automatically adjusting the route of the host vehicle.

In an aspect of the present disclosure, the service data includes real-time data about an available parking space in a parking facility. The real-time data about the available parking space in the parking facility includes a location of the available parking space in the parking facility.

In an aspect of the present disclosure, controlling the host vehicle includes providing navigational instructions to reach the location of the available parking space in the parking facility.

In an aspect of the present disclosure, the service data includes a payment required to park at the available parking space. The method further includes providing the payment required to park at the available parking space.

In an aspect of the present disclosure, the sign is within a predetermined distance from an attraction. A fee per person is required to access the attraction. The method includes sending passenger data to a remote server associated with the attraction. The passenger data includes a quantity and age ranges (e.g., modern driver/cabin monitoring systems can categorize faces into age groups) of passengers in the host vehicle.

In an aspect of the present disclosure, the method further includes receiving a payment required to access the attraction. The payment required to access the attraction is based on the fee per person required to access the attraction and the quantity and age ranges of passengers in the host vehicle. The method further includes, in response to receiving the payment required to access the attraction, granting access to the attraction.

The present disclosure also describes a system for facilitating uses of a code for vehicle experiences. In an aspect of the present disclosure, the system includes a host vehicle. The host vehicle includes a plurality of sensors and a vehicle controller in communication with the plurality of sensors. The vehicle controller is programmed to: receive code data from the code in a sign, wherein the sign is disposed outside the host vehicle; establish a connection with a service using the code data received from the code; in response to establishing the connection with the service, receive service data, wherein the service data includes information about the service; and in response to receiving the service data, control the host vehicle according to the service data received after establishing the connection with the service. The system described in this paragraph improves vehicle technology by allowing the vehicle to obtain information related to a particular geographic area and controlling the vehicle using this data.

In an aspect of the present disclosure, the connection with the service is established via a Uniform Resource Locator (URL). The code data includes the URL, and the code is a quick response (QR) code.

In an aspect of the present disclosure, the vehicle controller is programmed to send vehicle data of the host vehicle to a remote server in real time, and the vehicle data includes a speed of the host vehicle.

In an aspect of the present disclosure, the service data is an alert. The alert is indicative that a person is missing. The alert includes relevant-vehicle data. The relevant-vehicle data includes information about a relevant vehicle that transports the person that is missing. The vehicle controller is programmed to command at least one of the plurality of sensors to scan a plurality of remote vehicles within a predetermined distance from the host vehicle to identify the relevant vehicle.

In an aspect of the present disclosure, the service data includes real-time data about a commercial establishment. The real-time data about the commercial establishment indicates whether the commercial establishment is open. The real-time data about the commercial establishment includes a location, distance from the current vehicle location and other details of interest (e.g., type of food, types of services provided, type of payments accepted), of the commercial establishment.

In an aspect of the present disclosure, the host vehicle includes a display in communication with the vehicle controller, and the vehicle controller is programmed to: determine that the commercial establishment is open based the service data; and in response to determining that the commercial establishment is open, command the display to show navigational instructions to reach the location of the commercial establishment.

In an aspect of the present disclosure, the service data includes real-time data about road conditions along a route of the host vehicle. The road conditions include a triggering event. The triggering event includes at least one of a road closure, a lane closure, a speed reduction, workers present on the roadway, a traffic congestion, a road construction, high winds, limited visibility, a vehicular accident or similar events that would be of concern to a vehicle. The vehicle controller is programmed to: determine that the triggering event has occurred along the route of the host vehicle; and in response to determining that the triggering event has occurred along the route of the host vehicle, notify the user of the condition, automatically suggest or adjust the route of the host vehicle.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
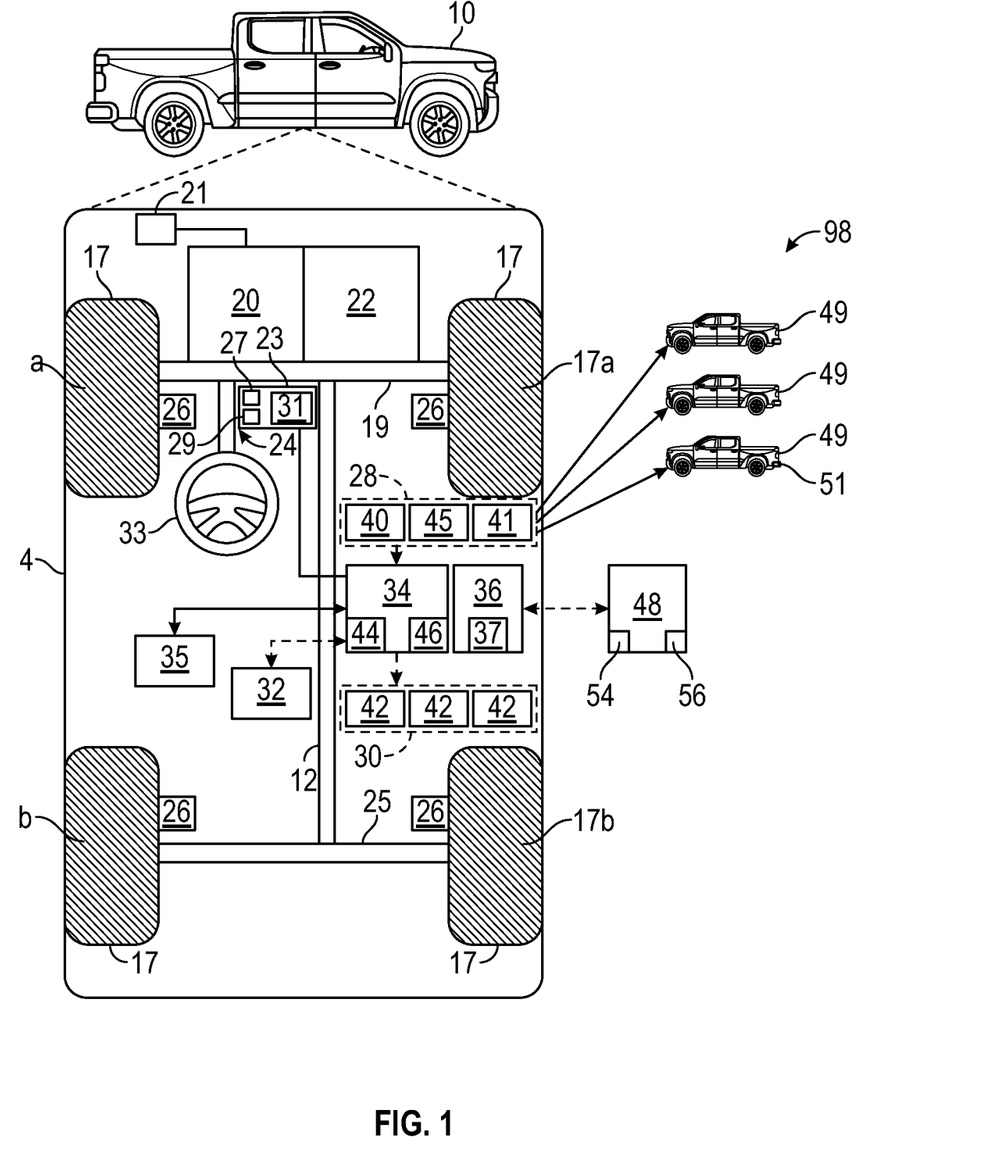
FIG. 1 is a block diagram depicting system for facilitating uses of codes for vehicle experiences, wherein the system includes a host vehicle and a remote server in communication with the host vehicle.

With reference to FIG. 1, a host vehicle 10 generally includes a chassis 12, a body 14, front and rear wheels 17 and may be referred to as a vehicle system. In the depicted embodiment, the host vehicle 10 includes two front wheels 17a and two rear wheels 17b. The body 14 is arranged on the chassis 12 and substantially encloses components of the host vehicle 10. The body 14 and the chassis 12 may jointly form a frame. The wheels 17 are each rotationally coupled to the chassis 12 near a respective corner of the body 14. The host vehicle 10 includes a front axle 19 coupled to the front wheels 17a and a rear axle 25 coupled to the rear wheels 17b.

In various embodiments, the host vehicle 10 may be an autonomous vehicle and may be part of a system 98 for facilitating uses of a code 58 for vehicle experiences. The system 98 may be referred to as a control system. The host vehicle 10 is, for example, a vehicle that is automatically controlled to carry passengers from one location to another. The host vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the host vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the host vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the host vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The host vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine and/or an electric motor. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the host vehicle 10. The sensors 40 are in communication with the vehicle controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more global positioning systems (GPS) transceivers 45, one or more tire pressure sensors, one or more cameras 41 (e.g., optical cameras and/or infrared cameras), one or more gyroscopes, one or more radio frequency (RF) scanners, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the host vehicle 10. Because the sensor system 28 provides data to the controller 34, the sensor system 28 and its sensors 40 are considered sources of information (or simply sources). The sensors 40 may scan remote vehicles 49 within a predetermined distance from the host vehicle 10 and obtain information relating to remote vehicles 49, such as the color, the license plate number, the make, the model, and/or the type of the remote vehicle 49). One or more of the remote vehicles 49 within the predetermined distance from the host vehicle 10 may a relevant vehicle 51 may be a remote vehicle 49 that matches the description of an AMBER alert.

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the host vehicle 10 in the globe. The GNSS transceiver 45 is in electronic communication with the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. The data storage device 32 may be part of the controller 34, separate from the controller 34, or part of the vehicle controller 34 and part of a separate system.

The host vehicle 10 may further include one or more airbags 35 in communication with the vehicle controller 34 or another controller of the host vehicle 10. The airbag 35 includes an inflatable bladder and is configured to transition between a stowed configuration and a deployed configuration to cushion the effects of an external force applied to the host vehicle 10. The sensors 40 may include an airbag sensor, such as an IMU, configured to detect an external force and generate a signal indicative of the magnitude of such external force. The vehicle controller 34 is configured to command the airbag 35 to deploy based on the signal from one or more sensors 40, such as the airbag sensor. Accordingly, the vehicle controller 34 is configured to determine when the airbag 35 has been deployed.

The vehicle controller 34 includes at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the host vehicle 10. The vehicle controller 34 of the host vehicle 10 is especially programmed to execute all or part of a method 100 as described in detail below.

The instructions may include one or more separate programs, each of which comprises an ordered listing of executable instructions for implementing logical functions. The instructions, when executed by the vehicle processor 44, receive and process signals from the sensor system 28, perform logic, calculations, methods and/or algorithms for automatically controlling the components of the host vehicle 10, and generate control signals to the actuator system 30 to automatically control the components of the host vehicle 10 based on the logic, calculations, methods, and/or algorithms. Although a single vehicle controller 34 is shown in FIG. 1, embodiments of the host vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the host vehicle 10.

In various embodiments, one or more instructions of the vehicle controller 34 are embodied in the system 98. The host vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the host vehicle 10. The user interface 23 is in electronic communication with the vehicle controller 34 and is configured to receive inputs by a user (e.g., a vehicle operator or a vehicle passenger). For example, the user interface 23 may include a touch screen and/or buttons configured to receive inputs from a vehicle user 11 (FIG. 6). Accordingly, the vehicle controller 34 is configured to receive inputs from the user via the user interface 23.

The host vehicle 10 may include one or more displays 29 configured to display information to the user (e.g., vehicle operator or passenger). In certain embodiments, the display 29 may be configured as a head-up display (HUD), and/or an information cluster display.

The communication system 36 is in communication with the vehicle controller 34 and is configured to wirelessly communicate information to and from other one or more remote servers 48, such as but not limited to, remote systems at a remote call center (e.g., ON-STAR by GENERAL MOTORS) and/or personal electronic devices, such as a mobile phone. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals to and from the remote server 48. The communication transceivers 37 may be considered sensors 40 or sources of information. The communication system 36 is configured to wirelessly communicate information between the host vehicle 10 and another vehicle. Further, the communication system 36 is configured to wirelessly communicate information between the host vehicle 10 and infrastructure or other vehicles.

The remote server 48 includes a includes at least one server processor 54 and a server non-transitory computer readable storage device or media 56. The server processor 54 may be a custom made or commercially available processor, a central processing unit (CPU), a graphics processing unit (GPU), an auxiliary processor among several processors associated with the server controller 54, a semiconductor-based microprocessor (in the form of a microchip or chip set), a macroprocessor, a combination thereof, or generally a device for executing instructions. The server computer readable storage device or media 56 may include volatile and nonvolatile storage in read-only memory (ROM), random-access memory (RAM), and keep-alive memory (KAM), for example. KAM is a persistent or non-volatile memory that may be used to store various operating variables while the server processor 54 is powered down. The server computer-readable storage device or media 56 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the server controller 54 in controlling the remote server 48.

Figure 2:
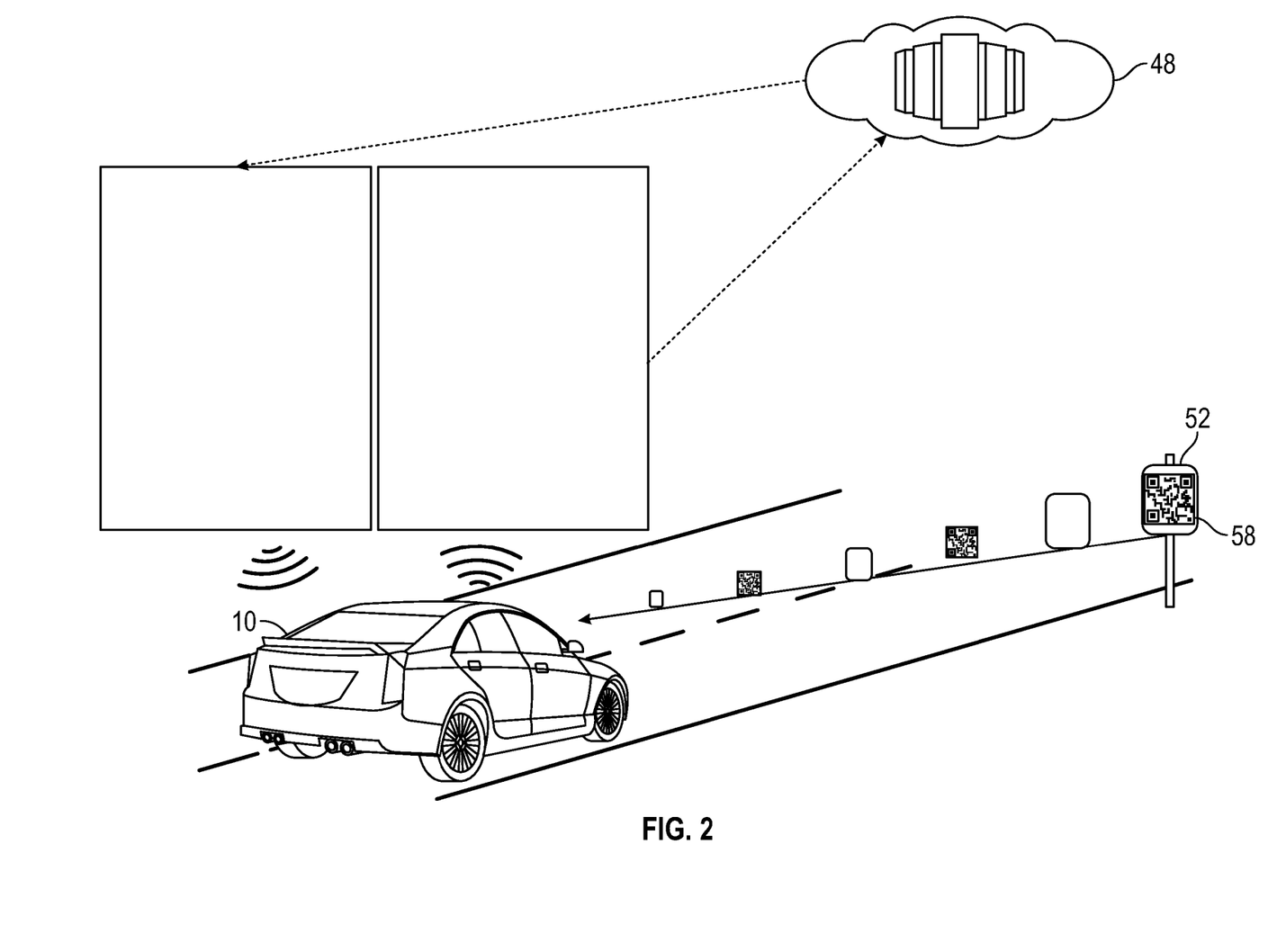
FIG. 2 is a perspective view of the host vehicle of FIG. 1, wherein at least one sensor of the host vehicle is reading a sign with a code, and the host vehicle is in a wireless communication with the remote server of FIG. 1.

With reference to FIGS. 1 and 2, the system 98 is configured to facilitate public and commercial uses of codes 58 for vehicle experiences. During use, one or more of the sensors 40 of the host vehicle 10 may scan a code 58 in a sign 52 to establish a connection with a service. In the present disclosure, the term "service" means software that performs automated tasks, responds to hardware events, or listens for data requests from other software. While the code 58 depicted in FIG. 2 is a quick response (QR) code, it is envisioned that the code 58 may be other types of machine-readable codes capable of embedding data, such as a barcode. Regardless of the specific type of machine-readable code used, the code 58 contains information, which is referred herein as code data. Accordingly, the term "code data" means information contained in the code 58. The cameras 41 of the host vehicle 10 are configured to read the code 58, such as a QR code or a barcode. Because the sensors 40 (including the cameras 41) are in communication with the vehicle controller 34, the vehicle controller 34 is programmed to receive the code data once the sensors 40, such as the camera 41, reads the code 58. Alternatively, the code may be a RF tag capable of being read by one or more RF scanners (i.e., sensors 40) of the host vehicle 10. The code 58 may be in a sign 52, such as a roadway sign. Alternatively, the sign 52 may be attached to a building or another type of infrastructure. Regardless of the specific location, the code 58 is disposed outside the host vehicle 10. For this reason, at least one of the sensors 40 of the host vehicle 10 is capable of reading (e.g., scanning) the code 58 to obtain the code data. Alternatively, the host vehicle 10 may obtain data through geofencing. In the present disclosure, the term "geofencing" means the use of GPS or RFID technology to create a virtual geographic boundary, enabling software to trigger a response when the host vehicle 10 enters or leaves a particular area. In the present disclosure, when the host vehicle 10 enters a particular area, the vehicle controller 34 receives data via geofencing.

With reference to FIG. 2, upon receipt of the code data, the vehicle controller 34 establishes a connection with the service via, for example, via a Uniform Resource Locator (URL). The URL may be part of the code data, and the service may be running on the remote server 48. Therefore, the vehicle controller 34 may establish a wireless connection with the remote server 48 using the code data obtained from the code 58. The vehicle server 34 and/or the remote server 48 may execute one or more authentication processes before establishing the connection between the vehicle controller 34 and the service to protect the vehicle controller 34 and/or the remote server 48 from unauthorized accesses.

Figure 3:
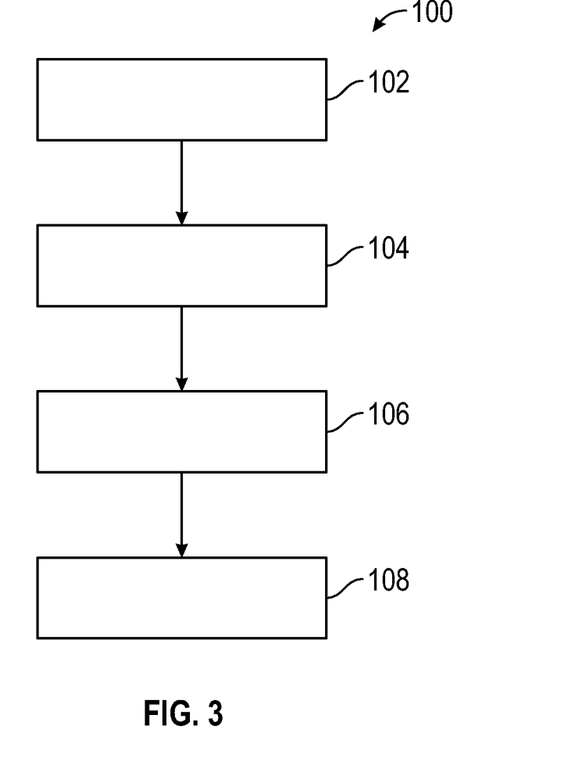
FIG. 3 is a flowchart of a method for facilitating uses of codes for vehicle experiences.

FIG. 3 is a flowchart of a method 100 for facilitating uses of codes 58 for vehicle experiences. The method 100 begins at block 102. At block 102, one or more sensors 40 (e.g., camera 41 and/or RF scanners) are used to read the code 58 and thereby obtain the code data embedded in in the code 58. Alternatively, the vehicle controller 34 may obtain data similar to the code data via geofencing when the host vehicle 10 enters a particular area by using, for example, the GPS transceivers 45. As discussed above, the sensors 40 are in communication with the vehicle controller 34. Accordingly, at block 102, the vehicle controller 34 receives the code data once the sensors 40 read the code 58. The code data may include an URL (or another locating information) that allows the vehicle controller 34 to locate the service on the remote server 48 by using the communication transceivers 37. After the vehicle controller 34 receives the code data, the method 100 proceeds to block 104.

At block 104, the vehicle controller 34 establishes a connection with the service using the code data received from the code 58. As discussed above, the code data may include an URL and the service may run on the remote server 48. Accordingly, the vehicle controller 34 establishes a connection with the remote server 48 using, for example, the communication transceivers 37 of the host vehicle 10. After establishing the connection with the service, the method 100 continues to block 106.

At block 106, the remote server 48 receives a communication (e.g., one or more requests) from the vehicle controller 34 in response to establishing the communication with the service. At this juncture, the service may perform different tasks. For example, the remote server 48 may request vehicle data from the host vehicle 10 to store for future uses. In the present disclosure, the term "vehicle data" means information about the host vehicle 10 that relates to the vehicle position, the current vehicle condition, and/or the vehicle motion. As non-limiting examples, the vehicle data includes vehicle speed, vehicle location, vehicle acceleration, vehicle type (e.g., autonomous vehicle or manual vehicle), vehicle heading, traffic information with a predetermined distance from the host vehicle 10, vehicle route, the vehicle destination, the history of the vehicle trajectory or movements, the usage of the vehicle brakes, the vehicle mileage, the state of charge of the battery 21, among others. The vehicle data may be collected by a public entity. After requesting the vehicle data, the method 100 proceeds to block 108.

At block 108, the vehicle controller 34 receives service data (e.g., a request for vehicle data) and controls one or more components of the host vehicle 10 to perform the service requested by the remote server 48 according to the service data. In the present disclosure, the term "service data" means information about the service provided to or requested by the remote service 48. In the example described above, the service entails obtaining vehicle data, in real time, from the host vehicle 10 as requested by the remote server 48. In response, the vehicle controller 34 obtains vehicle data from the sensors 40, in real time, and then transmits, in real time, the vehicle data requested by the remote server 48 using, for example, the communication transceivers 37 in response to establishing the connection with the server and/or the remote server 48. It is envisioned, however, that blocks 106 and 108 may entail different tasks and responses from the remote server 48 and/or the vehicle controller 34.

In one example, the service data is or includes an alert. The alert may be indicative that a person is missing, such as an AMBER alert in the United States. The alert includes relevant-vehicle data. The relevant-vehicle data includes information about the relevant vehicle 51 that transports the person that is missing, such as color, make, and/or model of the relevant vehicle 51. In this case, block 106 entails transmitting, by the remote server 48, the alert to the vehicle controller 34 of the host vehicle 10. Then, the method 100 proceeds to block 108. In this case, block 108 entails commanding, by the vehicle controller 34, the sensors 40 of the host vehicle 10 to scan, in real time, the remote vehicles 49 within the predetermined distance (e.g., two hundred feet) from the host vehicle 10 to identify the relevant vehicle 51. This predetermined distance is the maximum range of the sensors 40 of the host vehicle 10. The relevant vehicle 51 is the remote vehicle 49 that is carrying the missing person identified in the alert. If the relevant vehicle 51 is identified within the predetermined distance from the host vehicle 10, the vehicle controller 34 sends the information (e.g., location) about the relevant vehicle 51 to the remote server 48.

In another example, the sign 52 including the code 58 may be a roadway exit sign. In this case, the code data embedded in the code 58 includes information about commercial establishments located within a predetermined distance (e.g., two miles) from the roadway exit sign. In this example, the remote server 48 sends real-time data about the commercial establishments within the predetermined distance from the roadway exit sign at block 106 in response to establishing a connection with the service and/or the remote server 48. The real-time data about the commercial establishment may include the location of the commercial establishment and the operating hours of the commercial establishment. Then, in response to receiving the real-time data about the commercial establishment, the vehicle controller 34 may command one or more components of the host vehicle 10 to perform certain tasks. For example, the vehicle controller 34 may determine which of the commercial establishments within the predetermined distance from the roadway exit sign (i.e., sign 52) is open based on the service data received from the remote server 48 (i.e., the real-time data about the commercial establishments) at block 106. Next, the vehicle controller 34 may command the display 29 to provide navigational instructions to the vehicle operator to reach the location of the commercial establishment (or establishments) that is open at block 108. It is envisioned the vehicle controller 34 may automatically command the host vehicle 10 to drive to the commercial establishment that is open or the vehicle controller 34 may display navigational instructions to the vehicle operator to reach the location of the commercial establishment (or establishments) that is open based on a selection of the vehicle operator through the user interface 23.

In yet another example, the sign 52 including the code 58 may be a roadway sign. In this case, the service data retrieved from the remote server 48 after the sensors 40 read the code 58 includes real-time data about road conditions along the route of the host vehicle 10. As non-limiting examples, the road conditions include, but are not limited to, a triggering event. The triggering event may be a road closure, a traffic congestion, a lane closure, a speed reduction, workers present on the roadway, a road construction, and/or a vehicular accident. Using the service data, the vehicle controller 34 determines whether the triggering event has occurred along the route of the host vehicle 10 at block 106. Then, at block 108, the vehicle controller 34 automatically commands the host vehicle 10 to adjust its route to avoid the triggering event (e.g., traffic congestion). Alternatively, at block 108, the vehicle controller 34 may command the display 29 to show alternative routes that avoid the triggering event (e.g., traffic congestion). The vehicle operator of the host vehicle 10 may then select one of the alternative routes through the user interface 23.

In another example, at block 106, the service data includes real-time data about an available parking space in a parking facility. The real-time data about the available parking space in the parking facility includes a location of the available parking space in the parking facility (e.g., level, aisle and/or parking space number) that is suitable for the vehicle type (e.g., compact). Then, at block 108, the vehicle controller 34 commands the display 29 to show navigational instructions to reach the location of the available parking space in the parking facility. In addition, at block 106, the service data may include a payment required to park in the available parking space. Then, at block 108, the vehicle controller 34 provides the payment required to park at the available parking space.

In yet another example, the sign 52 is within a predetermined distance (e.g., five miles) from an attraction. In the present disclosure, the term "attraction" means a place which draws visitors by providing something of interest or pleasure. A fee per person is required to access the attraction. At block 106, the vehicle controller 34 sends passenger data to the remote server 48, which associated with the attraction. The passenger data may include a quantity of passengers, or age groups of passengers (adult/child) in the host vehicle 10. Then, at block 108, the vehicle controller 34 may send the payment required to access the attraction as a function of the fee per person required to access the attraction and the number of passengers in the host vehicle 10. Then, the remote server 48 receives the payment required to access the attraction. As discussed above, the payment required to access the attraction is based on the fee per person required to access the attraction and the quantity of passengers in the host vehicle 10. In response to receiving the payment required to access the attraction, the remote server 48 grants access to the attraction by, for example, automatically open a gate leading to the attraction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for facilitating uses of a code for vehicle experiences, comprising:
   receiving code data from the code in a sign, wherein the sign is disposed outside a host vehicle;
   establishing a connection with a service using the code data obtained from the code;
   in response to establishing the connection with the service, receiving service data, wherein the service data includes information about the service; and
   in response to receiving the service data, controlling, by a vehicle controller, the host vehicle according to the service data received after establishing the connection with the service;

wherein the sign is within a predetermined distance from an attraction, the service data includes a fee per person that is required to access the attraction, the vehicle controller is in communication with a remote server;
wherein the method further comprises:
sending, by the vehicle controller, passenger data to the remote server, the remote server is associated with the attraction, and the passenger data includes a quantity of passengers in the host vehicle;
receiving, by the remote server, payment data from the remote server, wherein the payment data includes a payment required to access the attraction, the payment required to access the attraction is based on the fee per person required to access the attraction and the quantity of passengers in the host vehicle;
in response to receiving the payment data, sending, by the vehicle controller, the payment required to access the attraction to the remote server; and
in response to receiving the payment required to access the attraction, automatically opening a gate leading to the attraction to grant access to the attraction, thereby allowing the host vehicle to drive into the attraction.

2. The method of claim 1, wherein the connection with the service is established via a Uniform Resource Locator (URL), the code data includes the URL, and the code is a quick response (QR) code, the host vehicle includes a plurality of sensors is in communication with the vehicle controller, at least one of the plurality of sensors is a camera configured to reach the QR code, and the vehicle controller is programmed to receive the code data once the camera reads the QR code, and the predetermined distance is five miles.

3. The method of claim 2, wherein controlling the host vehicle according to the service data includes sending vehicle data of the host vehicle to the remote server in real time, and the vehicle data includes a speed of the host vehicle, a location of the host vehicle, an acceleration of the host vehicle, a type of the host vehicle, a heading of the host vehicle, traffic information with a predetermined traffic distance from the host vehicle, a route of the host vehicle, a destination of the host vehicle, a history of a trajectory of the host vehicle, a usage of a plurality of brakes of the host vehicle, a mileage of the host vehicle, a state of charge of a battery of the host vehicle, the predetermined distance is a maximum distance range of the plurality of sensors, and the type of the host vehicle includes an autonomous vehicle and a manual vehicle.

4. The method of claim 2, wherein the service data includes real-time data about a commercial establishment, and the real-time data about the commercial establishment indicates whether the commercial establishment is open, and the real-time data about the commercial establishment includes a location of the commercial establishment, a distance from a current location of the host vehicle to the commercial establishment, a type of food served at the commercial establishment, and a type of payments accepted at the commercial establishment, the sign is a roadway exit sign, and the code is in the roadway exit sign.

5. The method of claim 4, further comprising:
determining that the commercial establishment is open based the service data; and
in response to determining that the commercial establishment is open, commanding, by the vehicle controller, the host vehicle to drive autonomously to the commercial establishment.

6. The method of claim 2, wherein the service data includes real-time data about road conditions along a route of the host vehicle, the road conditions include a triggering event, and the triggering event includes a traffic congestion and controlling the host vehicle according to the service data after establishing the connection with the service includes commanding, by the vehicle controller of the host vehicle, a display of the host vehicle to show alternative routes that avoid the traffic congestion.

7. The method of claim 2, wherein the service data includes real-time data about road conditions along a route of the host vehicle, the road conditions include a triggering event, and the triggering event is a traffic congestion, and the method further comprises:
determining that the triggering event has occurred along the route of the host vehicle; and
in response to determining that the triggering event has occurred along the route of the host vehicle, automatically adjusting the route of the host vehicle.

8. The method of claim 7, wherein the service data includes real-time data about an available parking space in a parking facility, and the real-time data about the available parking space in the parking facility includes a location of the available parking space in the parking facility.

9. The method of claim 8, wherein controlling the host vehicle includes providing navigational instructions to reach the location of the available parking space in the parking facility.

10. The method of claim 9, wherein the service data includes a payment required to park at the available parking space, and the method further comprises providing the payment required to park at the available parking space.

11. The method of claim 1, wherein the service data is an alert, the alert is indicative that a person is missing, the alert includes relevant-vehicle data, the relevant-vehicle data includes information about a relevant vehicle that is transporting the person that is missing, controlling the host vehicle according to the service data after establishing the connection with the service includes commanding, by a vehicle controller of the host vehicle, a plurality of sensors of the host vehicle to scan, in real time, a plurality of remote vehicles within a predetermined distance from the host vehicle to identify the relevant vehicle that is transporting the person that is missing; and the method further comprises, in response to identifying the relevant vehicle, sending, via the vehicle controller, location data about the relevant vehicle that is transporting the person that is missing to a remote server, and the location data about the relevant vehicle that is transporting the person that is missing includes a location of the relevant vehicle.

12. A system for facilitating uses of a code for vehicle experiences, comprises:
a host vehicle, wherein the host vehicle includes:
a plurality of sensors;
a vehicle controller in communication with the plurality of sensors, wherein the vehicle controller is programmed to:
receive code data from the code in a sign, wherein the sign is disposed outside the host vehicle;
establish a connection with a service using the code data received from the code;
in response to establishing the connection with the service, receive service data, wherein the service data includes information about the service; and
in response to receiving the service data, control the host vehicle according to the service data received after establishing the connection with the service;

wherein the sign is within a predetermined distance from an attraction, the service data includes a fee per person that is required to access the attraction, the vehicle controller is in communication with a remote server;

wherein the vehicle controller is programmed to send passenger data to the remote server, the remote server is associated with the attraction, and the passenger data includes a quantity of passengers in the host vehicle;

wherein the vehicle controller is programmed to receive payment data from the remote server, the payment data includes a payment required to access the attraction, and the payment required to access the attraction is based on the fee per person required to access the attraction and the quantity of passengers in the host vehicle;

in response to receiving the payment data, send the payment required to access the attraction to the remote server; and wherein, in response to receiving the payment required to access the attraction, the remote server is programmed to automatically open a gate leading to the attraction to grant access to the attraction, thereby allowing the host vehicle to drive into the attraction.

13. The system of claim 12, wherein the connection with the service is established via a Uniform Resource Locator (URL), the code data includes the URL, and the code is a quick response (QR) code, and the attraction is a place which draws visitors by providing something of interest or pleasure.

14. The system of claim 13, wherein the vehicle controller is programmed to send vehicle data of the host vehicle to the remote server in real time, and the vehicle data includes a speed of the host vehicle, a location of the host vehicle, an acceleration of the host vehicle, a type of the host vehicle, a heading of the host vehicle, traffic information with a predetermined distance from the host vehicle, a route of the host vehicle, a destination of the host vehicle, a history of a trajectory of the host vehicle, a usage of a plurality of brakes of the host vehicle, a mileage of the host vehicle, a state of charge of a battery of the host vehicle, and the predetermined distance is a maximum distance range of the plurality of sensors, the type of the host vehicle includes an autonomous vehicle and a manual vehicle.

15. The system of claim 13, wherein the service data includes real-time data about a commercial establishment, and the real-time data about the commercial establishment indicates whether the commercial establishment is open, and the real-time data about the commercial establishment includes a location of the commercial establishment, a distance from a current location of the host vehicle to the commercial establishment, a type of food served at the commercial establishment, and a type of payments accepted at the commercial establishment.

16. The system of claim 15, wherein the host vehicle includes a display in communication with the vehicle controller, and the vehicle controller is programmed to:
   determine that the commercial establishment is open based the service data; and
   in response to determining that the commercial establishment is open, command the display to show navigational instructions to reach the location of the commercial establishment.

17. The system of claim 13, wherein the service data includes real-time data about road conditions along a route of the host vehicle, wherein the road conditions include a triggering event, and the triggering event includes at least one chosen from a road closure, a traffic congestion, a road construction, and a vehicular accident, and the vehicle controller is programmed to:
   determine that the triggering event has occurred along the route of the host vehicle; and
   in response to determining that the triggering event has occurred along the route of the host vehicle, automatically adjust the route of the host vehicle.

* * * * *